(12) United States Patent
Baumgartner et al.

(10) Patent No.: US 11,222,388 B2
(45) Date of Patent: Jan. 11, 2022

(54) DISASTER RISK MANAGEMENT AND FINANCING SYSTEM, AND CORRESPONDING METHOD THEREOF

(71) Applicant: Swiss Reinsurance Company Ltd., Zurich (CH)

(72) Inventors: David Baumgartner, Zurich (CH); Nikhil Da Victoria Lobo, Washington, DC (US); Bridget Carle, Washington, DC (US)

(73) Assignee: Swiss Reinsurance Company Ltd., Zurich (CH)

(*) Notice: Subject to any disclaimer, the term of this patent is extended or adjusted under 35 U.S.C. 154(b) by 188 days.

(21) Appl. No.: 15/438,261

(22) Filed: Feb. 21, 2017

(65) Prior Publication Data
US 2017/0161859 A1    Jun. 8, 2017

Related U.S. Application Data

(63) Continuation of application No. PCT/EP2014/068042, filed on Aug. 26, 2014.

(51) Int. Cl.
*G06Q 50/26* (2012.01)
*G06Q 40/08* (2012.01)
(Continued)

(52) U.S. Cl.
CPC ......... *G06Q 50/26* (2013.01); *G06Q 10/0635* (2013.01); *G06Q 30/0202* (2013.01); *G06Q 30/0205* (2013.01); *G06Q 40/06* (2013.01); *G06Q 40/08* (2013.01)

(58) Field of Classification Search
CPC .............. G06Q 50/26; G06Q 10/0635; G06Q 30/0202; G06Q 30/0205; G06Q 40/06; G06Q 40/08
See application file for complete search history.

(56) References Cited

U.S. PATENT DOCUMENTS

2005/0144114 A1* 6/2005 Ruggieri ............... G06Q 40/08
                                                    705/37
2008/0300924 A1* 12/2008 Savage ................. G06Q 40/08
                                                    705/4
(Continued)

FOREIGN PATENT DOCUMENTS

WO        2011/088891 A1    7/2011

OTHER PUBLICATIONS

"Oliver Mahul and Hannah Yi, GFDRR, Disaster Risk Financing and Insurance Program, Nov. 2012, https://www.gfdrr.org/gfdrr/DRFI" (Year: 2012).*

(Continued)

*Primary Examiner* — Christopher Bridges
*Assistant Examiner* — Toan Duc Bui
(74) *Attorney, Agent, or Firm* — Oblon, McClelland, Maier & Neustadt, L.L.P.

(57) ABSTRACT

A method and system, the method including capturing country-specific parameters of a risk-exposed country relating to stored predefined criteria, assigning one or more disaster event types to a disaster history table, capturing and storing mapping parameters for a geographic risk map, assigning each of a plurality of selectable disaster financing types to a definable cost factor capturing the capital cost of the disaster financing type in relation to its application for disaster mitigation, determining expected catastrophe losses by a loss frequency function and the geographic risk map for various scenarios of occurring natural disaster event types, and preparing a forecast of an effect of the disaster financing type to cover the catastrophe losses based on the coverage structure, the assigned cost factors, and the determined expected catastrophe losses

18 Claims, 5 Drawing Sheets

(51) Int. Cl.
G06Q 40/06 (2012.01)
G06Q 10/06 (2012.01)
G06Q 30/02 (2012.01)

(56) References Cited

U.S. PATENT DOCUMENTS

| | | | | |
|---|---|---|---|---|
| 2009/0287612 A1* | 11/2009 | Horowitz | G06Q 40/04 | 705/36 R |
| 2010/0042442 A1* | 2/2010 | Seitomer | G06Q 40/00 | 705/4 |
| 2010/0223078 A1* | 9/2010 | Willis | G06Q 40/08 | 705/4 |
| 2012/0095904 A1* | 4/2012 | Katsuyama | G06Q 20/10 | 705/39 |
| 2012/0150570 A1* | 6/2012 | Samad-Khan | G06Q 40/08 | 705/4 |
| 2013/0036000 A1* | 2/2013 | Giordano | G06Q 20/385 | 705/14.27 |
| 2015/0025933 A1* | 1/2015 | Andelman | G06Q 10/0635 | 705/7.28 |
| 2015/0100353 A1* | 4/2015 | Hughes | G06Q 40/08 | 705/4 |
| 2015/0170288 A1* | 6/2015 | Harton | G06Q 40/08 | 705/4 |
| 2016/0343093 A1* | 11/2016 | Riland | G06Q 10/04 | |
| 2017/0154383 A1* | 6/2017 | Wood | G06Q 40/08 | |

OTHER PUBLICATIONS

"Kevin A Borden and Susan L Cutter, Spatial patterns of natural hazards mortality in the United States, Dec. 17, 2008, International Journal of Health Geographies 2008, p. 5-13" (Year: 2008).*

"R. Mechler, S. Hochrainer, J. Linnerooth-Bayer, G.Pflug—The IIASA CATSIM Model, Public Sector Financial Vulnerability to Disasters, In Measuring Vulnerability to Natural Hazards: Towards Disaster Resilient Societies, J. Birkmann, Ed. Tokyo: UNU Press, pp. 380-398, 2006" (Year: 2006).*

"USAID-OAS Caribbean Disaster Mitigation Project, Natural Hazards and Economic Development: Policy Considerations, Apr. 1999, Organization of American States General Secretariat Unit for Sustainable Development and Environment—Caribbean Disaster Mitigation Project" (Year: 1999).*

"Oliver Mahul and Hannah Yi, GFDRR, Disaster Risk Financing and Insurance Program, Nov. 2012, https://www.gfdrr.org/gfdrr/DRFI" (Year: 2012) (Year: 2012).*

"Kevin A Borden and Susan L Cutter, Spatial patterns of natural hazards mortality in the United States, Dec. 17, 2008, International Journal of Health Geographies 2008, p. 5-13" (Year: 2008) (Year: 2008).*

"R. Mechler, S. Hochrainer, J. Linnerooth-Bayer, G.Pflug—The IIASA CATSIM Model, Public Sector Financial Vulnerability to Disasters, In Measuring Vulnerability to Natural Hazards: Towards Disaster Resilient Societies, J. Birkmann, Ed. Tokyo: UNU Press, pp. 380-398, 2006" (Year: 2006) (Year: 2006).*

"USAID-OAS Caribbean Disaster Mitigation Project, Natural Hazards and Economic Development: Policy Considerations, Apr. 1999, Organization of American States General Secretariat Unit for Sustainable Development and Environment—Caribbean Disaster Mitigation Project" (Year: 1999) (Year: 1999).*

"Dilley, Maxx; Chen, Robert S.; Deichmann, Uwe; Lerner-Lam, Arthur L.; Arnold, Margaret; Agwe, Jonathan; Buys, Piet; Kjevstad, Oddvar; Lyon, Bradfield; Yetman, Gregory, Natural disaster hotspots: A global risk analysis, Apr. 30, 2005, The World Bank Hazard Management Unit" (Year: 2005) (Year: 2005).*

International Preliminary Report on Patentability issued in International Application No. PCT/EP2014/068042 dated Nov. 22, 2016.

* cited by examiner

DISASTER RISK MANAGEMENT AND FINANCING SYSTEM, AND CORRESPONDING METHOD THEREOF

CROSS REFERENCE TO RELATED APPLICATION

This application is a continuation of PCT International Application No. PCT/EP2014/68042, filed on Aug. 26, 2014, the entire contents of which are incorporated herein by reference.

FIELD OF THE INVENTION

The present invention relates to a disaster management and financing system for forecasting the impact of disaster mitigation as well as and automated signaled and applied disaster financing and mitigation means based on location-dependent natural disaster impacts. It especially relates to automated, computer-based disaster risk management and financing systems.

BACKGROUND OF THE INVENTION

Within the last decade, natural disasters have had devastating impacts on the socio-economic and environmental landscape, mainly of developing countries and emerging market countries, including the so called BRIC countries (Brazil, Russia, India and China) and MIKT countries (Mexico, Indonesia, South Korea and Turkey) as the largest representatives of the latter. For example in the Caribbean, on average, six natural disasters occurred in the region annually between 1970 and 2006, with higher incidences in Haiti and the Dominican Republic. The active hurricane season of 2004 resulted in damages in the Caribbean amounting to USD 3.1 billion, with catastrophic impacts on the gross domestic product (GDP) of member countries, particularly Grenada (200 percent of GDP). Similarly, Hurricane Dean in 2007 had a major destructive impact on the economies of Belize, Jamaica, and Saint Lucia. Approximately 14 percent of the Saint Lucian population was affected, including 47 percent of the vulnerable community, with costs to the Jamaican and Belizean economies amounting to USD 329.34 million and USD 89.1 million, respectively. According to the Centre for Research on the Epidemiology of Disasters, damages from natural disasters in 2010 showed a different distribution than that seen for previous events (Source FAO (Food and Agriculture Organization of the United Nations), February 2013, Status of Disaster Risk Management). The major share of global damages (45.9 percent) was attributed to the 12 Jan. 2010 earthquake in Haiti. It is well known that these shocks may cause spillovers at the macroeconomic level, since fiscal and external pressures can lead to imbalances that spark economic crisis and an increased incidence of poverty (Source IMF (International Monetary Fund) Working Paper WP/04/224).

Although such catastrophic events do often cause more grievous harm to the economy and social life of poorer countries, even industrially developed countries are not immune to the destructive impact of these events on the country's economy. Overall in 2013, there were 308 major disaster events, of which 150 were natural catastrophes and 158 man-made (Source sigma 1/2014, SwissRe). Almost 26,000 people lost their lives or went missing in the disasters. Typhoon Haiyan struck the Philippines in November 2013, one of the strongest typhoons ever recorded worldwide. It killed around 7,500 people and left more than 4 million homeless. Haiyan was the largest humanitarian catastrophe of 2013. The next most extreme in terms of human cost was the June flooding in the Himalayan state of Uttarakhand in India, in which around 6,000 died. FIG. 2 shows the number of victims from the years 1970 to 2013. The reference number 1 denotes the Bangladesh storm of 1970, 2 denotes the Tangshan earthquake in China of 1976, 3 denotes Cyclone Gorky of Bangladesh in 1991, 4 denotes the Indian Ocean earthquake and tsunami of 2004, 5 denotes Cyclone Nargis in Myanmar of 2008, 6 denotes the Haiti earthquake of 2010, and 7 denotes Typhoon Haiyan in the Philippines of 2013. In FIG. 2, the scale is logarithmic, i.e. the number of victims increases tenfold per band (Source: Swiss Re Economic Research & Consulting). The total economic losses from natural catastrophes and man-made disasters were around USD 140 billion last year. That was down from USD 196 billion in 2012 and well below the inflation-adjusted 10-year average of USD 190 billion. Asia was hardest hit, with the cyclones in the Pacific generating most economic losses. Most of the remainder was caused by weather events in North America and Europe. FIG. 1 shows the number of major catastrophic events from 1970 to 2013 (Source SwissRe Economic Research & Consulting). Catastrophe losses in 2013 were equivalent to 0.19% of GDP, also below the 10-year average of 0.30%. Natural catastrophe-related losses were around USD 131 billion in 2013, stemming mostly from floods and other extreme weather events in Asia, North America, and Europe. Man-made disasters are estimated to have caused more than USD 9 billion of the total USD 140 billion damages in 2013, up from USD 8 billion in 2012. Table 1 shows the economic losses of 2013 in percentage of the GDP.

TABLE 1

(The economic losses of 2013 in percentage of the GDP. *denotes rounded numbers and **inflation adjusted values (Source sigma January 2014 SwissRe))

| Country | In USD bn | In % of GDP |
|---|---|---|
| North America | 32 | 0.17% |
| Latin America & Caribbean | 9 | 0.16% |
| Europe | 33 | 0.15% |
| Africa | 1 | 0.05% |
| Asia | 62 | 0.26% |
| Oceania/Australia | 3 | 0.16% |
| Seas/Space | 1 | |
| Total | 140* | 0.19% |
| 10-year average | 190** | 0.30% |

However, the continental numbers do not show the individual burden of the concerned countries, which can have massive and severe impacts on a country and its government due to multiple overruns of the country's GDP (Gross Domestic Product). Table 2 shows the major disasters of the last 40 years in percentage of the GDP of the concerned country in the year of the event.

TABLE 2

(The major disasters of the last 40 years in percentage of the GDP of the concerned country in the year of the event (Source: Swiss Re, Closing the financial gap)

| Year | Event | Country | Economic Losses in USD millions | In % of GDP | Victims |
|---|---|---|---|---|---|
| 2005 | Hurricane Katrina | US, Gulf of Mexico, Bahamas, North America | 140,000 | 1.1% | 1,836 |
| 2008 | Earthquake | China | 124,578 | 2.8% | 87,449 |
| 1995 | Great Hanshin earthquake | Japan | 82,399 | 1.6% | 6,425 |
| 2010 | Floods, mudslides | China | 53,113 | 0.9% | 2,480 |
| 2008 | Hurricane Ike | US, Gulf of Mexico, Turks and Caicos Islands, Haiti, Cuba, Bahamas, Dominica Republic | 40,000 | 0.3% | 136 |
| 2010 | Earthquake | Chile | 30,000 | 15.1% | 521 |
| 1998 | Flooding along Yangtze River | China | 30,000 | 3.0% | 3,656 |
| 1994 | Northridge earthquake | United States | 30,000 | 0.4% | 61 |
| 2004 | Chuetsu earthquake | Japan | 29,276 | 0.6% | 39 |
| 1992 | Hurricane Andrew | United States | 26,500 | 0.4% | 43 |
| 2004 | Hurricane Ivan | United States | 22,000 | 0.2% | 124 |
| 1999 | Earthquake | Turkey | 20,000 | 8.0% | 19,118 |
| 2008 | Snow storms | China | 20,000 | 0.4% | 130 |
| 2005 | Hurricane Wilma | United States | 20,000 | 0.2% | 35 |
| 1995 | Drought in Northeastern China | China | 19,669 | 2.7% | 0 |
| 2008 | Hurricane Gustav | United States | 17,500 | 0.1% | 135 |
| 2004 | Hurricane Charley | United States | 16,000 | 0.1% | 24 |
| 2010 | Wild fires | Russia | 15,000 | 1.0% | 50 |
| 2005 | Hurricane Rita | United States | 15,000 | 0.1% | 34 |
| 2010 | Earthquake | Haiti | 8,000 | 114% | 220,000 |
| 1988 | Hurricane Gilbert | St Lucia | 1,000 | 386% | 341 |
| 2004 | Hurricane Ivan | Grenada | 889 | 203% | 124 |
| 1991 | Cyclones Val and Wasa | Samoa | 278 | 248% | 14 |
| 1990 | Cyclone Ofa | Samoa | 200 | 178% | 8 |
| 1985 | Cyclones Eric and Nigel | Vanuatu | 173 | 143% | 25 |
| 2009 | Tsunami | Samoa | 120 | 22% | 149 |

In the above-mentioned example of the Caribbean, the problems related to disaster risk management and financing can be easily illustrated by the agriculture sector. The agriculture sector can be subject to different types of hazards, including cyclones, floods, and droughts. Looking back at the last 40 years to determine the top 10 natural disasters in terms of loss of life, total number of people affected, and economic losses, one can see that cyclones often pose the largest threat to human life and cause the highest economic losses. This applies also for the agriculture sector. However depending on the country, other hazards might be more significant (droughts for Africa etc.). In the example of the Caribbean, the regional agriculture sector continues to be severely undermined as a result of natural disasters. Hurricane Ivan in 2004 decimated Grenada's agriculture sector and accrued losses in excess of USD 37 million. Ivan destroyed the entire banana industry and approximately 40 percent of mature cocoa trees of the country. Almost all of the nutmeg trees toppled (90 percent), with significant negative implications for the local rural economy (Source OECS 2004, Grenada-Macro-socio-economic assessment of the damages caused by Hurricane Ivan). Total annual average revenue available to farmers decreased by 89.9 percent, from USD 18.7 million during 2002-2004 to USD 1.9 million after the disaster (2005-2009) (Source ITC, July 2010, European Union All ACP Commodities Program, WTO (World Trade Organization). Similarly, in 2007, Hurricane Dean ravaged Caribbean agricultural productivity. Jamaica reported damages of approximately USD 43 million. Overall, 56,537 crop farmers and 7,170 livestock farmers were seriously affected, with the greatest impact being among small farms. Belize's agriculture sector documented damage and loss of USD 54 million, with the majority of costs recorded in the cropping subsector (90.6 percent). Saint Lucia's agriculture sector reported losses of roughly USD 10 million, with the banana industry accounting for 67 percent of the overall burden of the sector (USD 6.7 million). The Economic Commission for Latin America and the Caribbean (ECLAC) posits that Hurricane Dean will have serious' implications for future banana production in Saint Lucia and predicted a reduction in banana exports of USD 5.7 million up to February 2008. Moreover, a Crop and Food Security Assessment Mission conducted by the Food and Agriculture Organization of the United Nations (FAO) in Haiti in September 2010 highlighted a decrease in the production of cereals (by 9 percent), legumes (by 20 percent), root crops (by 12 percent), and plantain (by 14 percent) when compared to previous years. Although the earthquake was largely an urban event, its effects resounded throughout the rural agricultural areas (Source FAO (Food and Agriculture Organization of the United Nations), February 2013, Status of Disaster Risk Management).

A case study of the 2009-2010 El Niño-induced Caribbean drought reported startling impacts on the region's agriculture sector (Source FAO (Food and Agriculture Organization of the United Nations), February 2013, Status of Disaster Risk Management). Vast amounts of finances were spent by the governments to mitigate the impacts of the drought. In Guyana, the Government allocated USD 1.3 million to bring relief to farmers in a first region in February 2010 and spent USD 16,000 a day in another region to operate pumps and perform other work essential to water delivery. The banana industry in Dominica reported a 43 percent reduction in production in 2010 compared to previous years. Similarly, the 2010 onion and tomato crops in Antigua and Barbuda decreased by 25 percent and 30 percent, respectively, due to water-stressed conditions. Saint Vincent and the Grenadines documented a 20 percent overall decrease in agricultural productivity during the period. Impacts of the drought were also reflected to some extent in commodity prices. Tomato prices in Saint Vincent and the Grenadines rose by 155 percent during the peak of the drought (February-March 2010). The Central Bank of Trinidad and Tobago reported an increase in the price of fruits in March 2010 by 20.1 percent when compared to February of the same year. According to the report, the drought-induced bush fires destroyed many acres of citrus farms in the two-island republic, resulting in an increase in the cost of citrus importation from USD 6.3 million in 2008 to USD 8.3 million by the end of 2010. The study emphasized that it is imperative that the concerned countries mainstream their forecasting and alerting systems for drought and for them to develop and implement cost-effective policies for adapting to and mitigating drought-related impacts.

There is an urgent need to integrate, automate, and synchronize disaster risk management (DRM) in governmental risk management through appropriate systems, allowing a controllable, reproducible, and easily applicable monitoring and risk transfer/balancing. As mentioned, natural hazards in many countries have a substantial potential to cause large losses to crops and infrastructure, a great potential to negatively affect economic and macroeconomic performance, and even have the potential to destabilize economies on a global scale. For the agriculture sector, the effects are even more critical in light of the projected impacts of climate change and variability on smaller developing states, the peculiar vulnerabilities of these states, and the moderate to high poverty levels of most of such states (cf. Baas, S. et al., Disaster risk management systems analysis, 2008). In fact, many disaster-related losses can be avoided or reduced if appropriate policies and mitigation instruments are implemented to address the root causes of vulnerability, while also integrating mitigation, preparedness, and response mechanisms into overall development planning. The development of sectoral DRM plans for agricultural and other sectors at the national level therefore represents a powerful strategy for increasing resilience to natural hazards and forging a sustainable path to development.

However, natural catastrophes are rare events, which are typically not subject to the statistics of big numbers. Their occurrence is subject to high fluctuations that are impossible to forecast in the long term. Hurricanes, cyclones, and typhoons often show the highest annual rate of recurrence. In many affected countries, this exceeds 0.7 events per year over a 20-year time span. Note that hurricanes, cyclones, and typhoons are all the same weather phenomenon. The different names for these storms are specific to their location. In the Atlantic and Northeast Pacific, the term "hurricane" is used. The same type of disturbance in the Northwest Pacific is called a "typhoon," while "cyclones" occur in the South Pacific and Indian Ocean. For this application, the terms are used as synonyms describing the same natural hazard phenomenon. Droughts and floods are typically less recurrent. It is important to note that due to the limited time horizon, such numbers are often only indicative and cannot be used for probabilistic risk assessment approaches, i.e. the prior art system and methods for risk assessment cannot be applied or can only be applied with great reservations. Further, the interactions among possible instrumental steps for mitigating the consequences of a catastrophic risk event and for providing more resilient governance are difficult to understand, judging from the results they achieve when a disaster event occurs. Moreover, it is almost impossible to acquire indepth experience as a person responsible for applying possible mitigation means. Therefore, in order to provide a better understanding of the possible instrumental means and the effectiveness thereof, it is important to provide an automated system for disaster risk management (DRM) and disaster risk financing (DRF) taking over the role of the Country Risk Officer (CRO) of a country. It is also important to provide a system for testing a developed disaster strategy for different perils such as earthquakes, hurricanes, typhoons, droughts, and/or floods. The system should allow for improving a country risk profile of a specific country, expanding and improving test sets based on the present basic data of a country, self-analyzing trial runs on simulation effectiveness, and developing an appropriate electronic automated system.

SUMMARY OF THE INVENTION

One object of the present invention is to provide an automated, self-adjustable system and method for enabling a better understanding of the effect of operational adjustments to possible instrumental means and the effectiveness thereof. Another object of the present invention is to provide an automated system for disaster risk management taking over the role of the Country Risk Officer of a country. Another important task is to provide a system for testing a developed disaster strategy for different perils such as earthquakes, hurricanes, typhoons, droughts, and/or floods in a country-specific setting. The system should allow for improving a country risk profile of a specific country, expanding and improving test sets based on the present basic data of a country, self-analyzing trial runs on simulation effectiveness, and developing an appropriate electronic automated system. Finally, the system should provide the possibility of generating a disaster risk management and strategy thereof for natural perils to which a specific country is actually exposed, linking temporal, topological, geographical, social, and population structures of a country.

According to the present invention, these objects are attained in particularly by the features of the independent claims. In addition, further advantageous embodiments can be derived from the dependent claims and related descriptions.

The above-mentioned objects related to the disaster risk management and disaster risk financing systems for forecasting the impact of disaster mitigation and financing means based on location-dependent natural disaster impacts are attained according to the present invention particularly in that measuring parameters of historical disaster events are captured in order to determine the impact of natural disaster events and critical values of parameters of natural disaster events are used as triggers in order to generate forecasts of the impacts of disaster events within a geographic area; in that country-specific parameters of a risk-exposed country are captured, relating to stored predefined criteria, wherein the country-specific parameters comprise at least national economic and national budgetary parameters; in that one or more disaster event types are assigned to a disaster history table, wherein each disaster event type comprises a plurality of type-specific measuring parameters of historical natural disaster events and associated type-specific loss frequency function parameters that provide a corresponding loss frequency function for each natural disaster event type, and wherein the magnitude of a loss to its expected exceedance frequency is parameterized by means of the loss frequency function, where the exceedance frequency is a measure of the annual probability that an event or loss will meet or exceed a given magnitude in any given timeframe; in that the system comprises mapping parameters for capturing and storing a geographic risk map, wherein for each of the natural disaster event types, corresponding mapping parameters are captured and stored, which define danger zones for the specific natural disaster event type; in that the system comprises a plurality of selectable disaster financing means, wherein each of the selectable disaster financing means is assigned to a definable cost factor capturing the capital cost of the financing means in relation to its application for disaster mitigation, and wherein for each of the selectable disaster financing means, a variable budgetary share factor can be allocated and adapted by means of an allocation module defining the coverage structure in case of a catastrophic disaster event; and in that expected catastrophe losses are determined by means of the loss frequency function and the geographic risk map for various scenarios of occurring natural disaster event types and a forecast of the effect of the disaster financing means to cover these losses is prepared based on the coverage structure, the assigned cost factors, and the determined expected catastrophe losses. A first disaster financing means can for example be related to a contingency reserves unit comprising an assigned cost factor set to 1, a second selectable disaster financing means is related to a contingent debt facility unit comprising an assigned cost factor depending on definable credit condition parameters, and a third selectable disaster financing means is related to an insurance facility unit comprising an assigned cost factor set e.g. to 1.7, a factor e.g. based on current market benchmarks. Further, based on the disaster history table comprising the stored natural disaster event types, at least four loss frequency curves capturing the perils of hurricanes, floods, earthquakes and droughts can e.g. be generated together with the corresponding mapping parameters of the geographic risk map. The system can e.g. comprise at least country-specific parameters related to population and/or demographics and/or gross domestic product and/or sovereign budget and/or inflation rate and/or economic structure and/or export/import values. Finally, the expected catastrophe losses can e.g. be determined through numerical integration of the loss frequency curves. The present invention advantageously provides a system for forecasting expected catastrophe losses and the effect of the corresponding financing tools the user chooses to cover these losses. The invention also advantageously provides a system for setting up a coverage structure which satisfies country-specific needs and for testing the performance of a specific, defined scheme of disaster mitigation and financing means for various scenarios in real time.

In one embodied variant, the system comprises a second MonteCarlo module for generating a probabilistic Monte Carlo loss simulation for a probabilistic multi-year simulation as a final test of the effectiveness of a chosen coverage structure for a specific pre-financing scheme. The Monte-Carlo module can e.g. generate the probabilistic Monte Carlo loss simulation for a probabilistic 30-year simulation. This embodied variant has, among other things, the advantage that the system allows a complete monitoring and assessment of the impact of a chosen coverage structure under different scenarios, in real time.

In an other embodied variant, the system comprises three selectable input channels, wherein in a first channel selectable by means of a user interface, a first budgetary share factor is determined and assigned to the corresponding first disaster financing means, in a second channel selectable by means of a user interface, a second budgetary share factor is determined and assigned to the corresponding second disaster financing means, and in a third channel selectable by means of a user interface, a third budgetary share factor is determined and assigned to the corresponding third disaster financing means. The budgetary share factors of the coverage structure are varied by means of the user interface in order to optimize the effect of the disaster financing means to cover possible losses. Furthermore, the allocation module can e.g. comprise an activating device, by means of which, based on the generated coverage structure with the allocated budgetary share factors, it is possible to transmit a corresponding control signal to the monitoring device. This embodied variant has, among other things, the advantage that the system can provide a user with the experience of a Country Risk Officer (CRO) by looking at a nation's risk profile and creating an appropriate risk management plan to be tested through realistic scenarios.

In a further embodied variant, the allocation module comprises a second Monte Carlo module, wherein by means of the second Monte Carlo module and based on the allocated variable budgetary share factors of the coverage structure, a plurality of data records comprising coverage structures with varied budgetary share factors are generated, wherein the coverage structure with the allocated budgetary share factors is optimized by means of the system based on the effect of the disaster financing means for various scenarios of occurring natural disaster event types. This embodied variant has, among other things, the advantage that the system automated generates an optimized coverage structure with optimized allocated budgetary share factors.

In still another embodied variant, the allocation module comprises a signaling device, wherein the selectable disaster financing means are activated based on the allocated budgetary share factors by means of signal transmission. Furthermore, the allocation module can e.g. comprise a signaling device, wherein upon triggering an optimized coverage structure, the selectable disaster financing means are activated based on the allocated budgetary share factors by means of signal transmission. This embodied variant has, among other things, the advantage that the system can be fully automated, i.e. that the system automatically generates and optimizes a coverage structure with optimized allocated budgetary share factors, and also automatically activates the appropriate disaster financing means to provide the disaster risk management. Furthermore, the system allows efficient and fully automated monitoring and control of the work of the Country Risk Officer in the testing of possibly proposed risk management plans through the use of realistic scenarios.

Finally, in addition to the system described above and the corresponding method, the present invention also relates to a computer program product that includes computer program code means for controlling one or more processors of the control system in such a manner that the control system performs the proposed method; the invention also relates, in particular, to a computer program product that includes a computer-readable medium containing therein the computer program code means for the processors.

BRIEF DESCRIPTION OF THE DRAWINGS

The present invention will be explained in more detail by way of example in reference to the drawings in which.

DETAILED DESCRIPTION OF THE PREFERRED EMBODIMENTS

Figure 1:
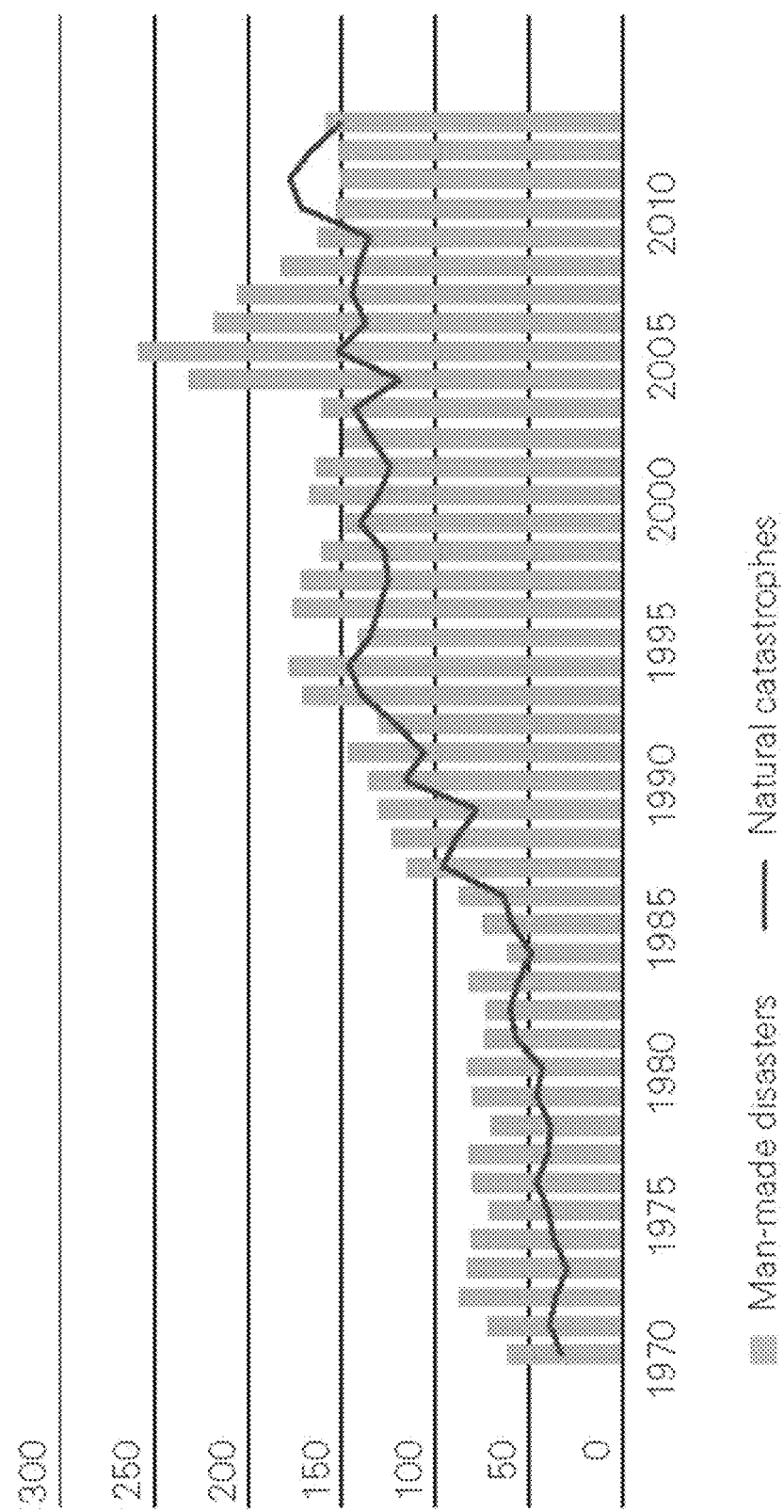
FIG. 1 shows diagrams schematically illustrating the number of major catastrophic events from 1970 to 2013.
Figure 2:
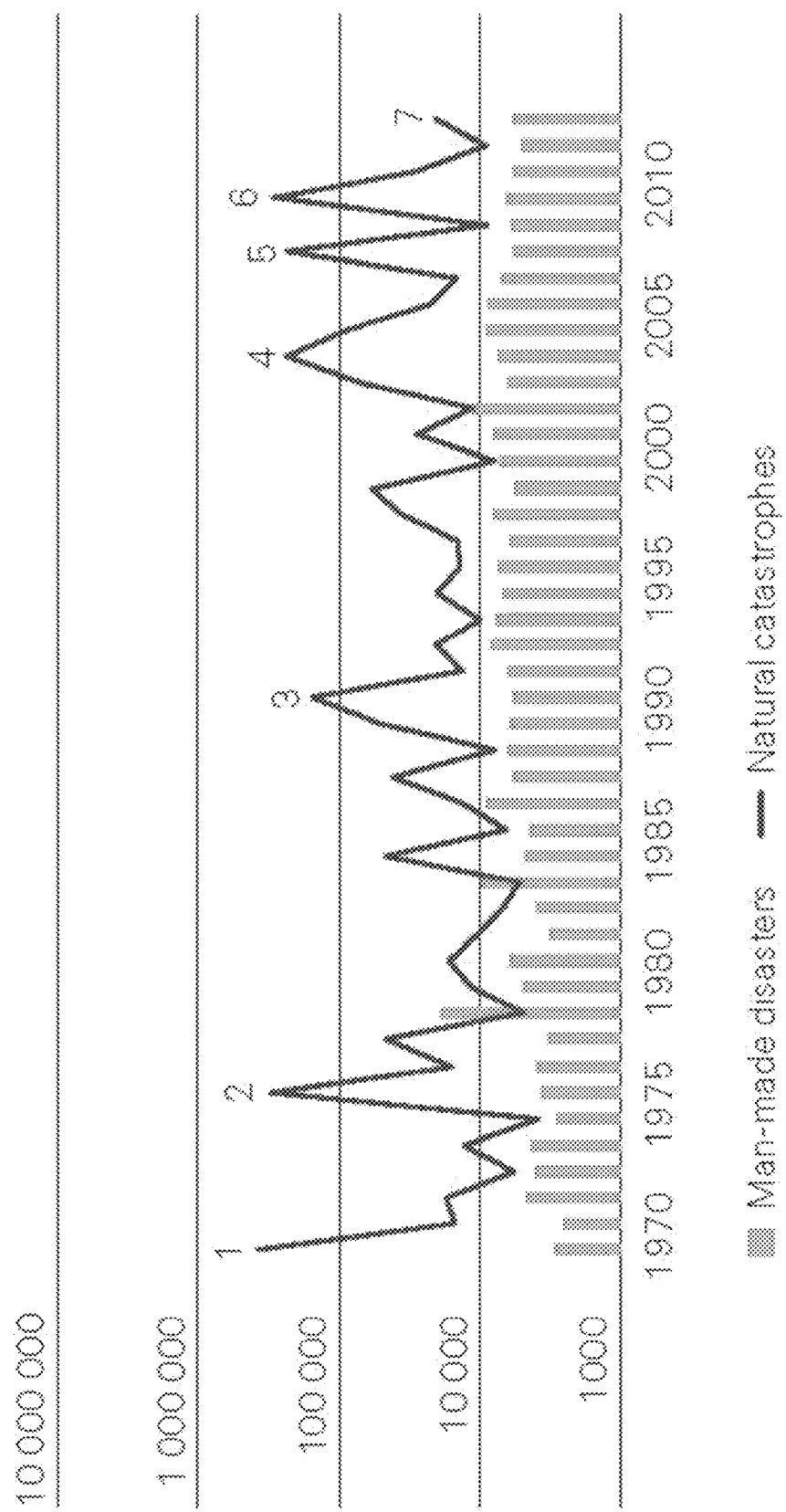
FIG. 2 shows a diagram schematically illustrating the number of victims from the years 1970 to 2013. The reference number 1 denotes the Bangladesh storm of 1970, 2 denotes the Tangshan earthquake in China of 1976, 3 denotes Cyclone Gorky of Bangladesh in 1991, 4 denotes the Indian Ocean earthquake and tsunami of 2004, 5 denotes Cyclone Nargis in Myanmar of 2008, 6 denotes the Haiti earthquake of 2010, and 7 denotes Typhoon Haiyan in the Philippines of 2013.
Figure 3:
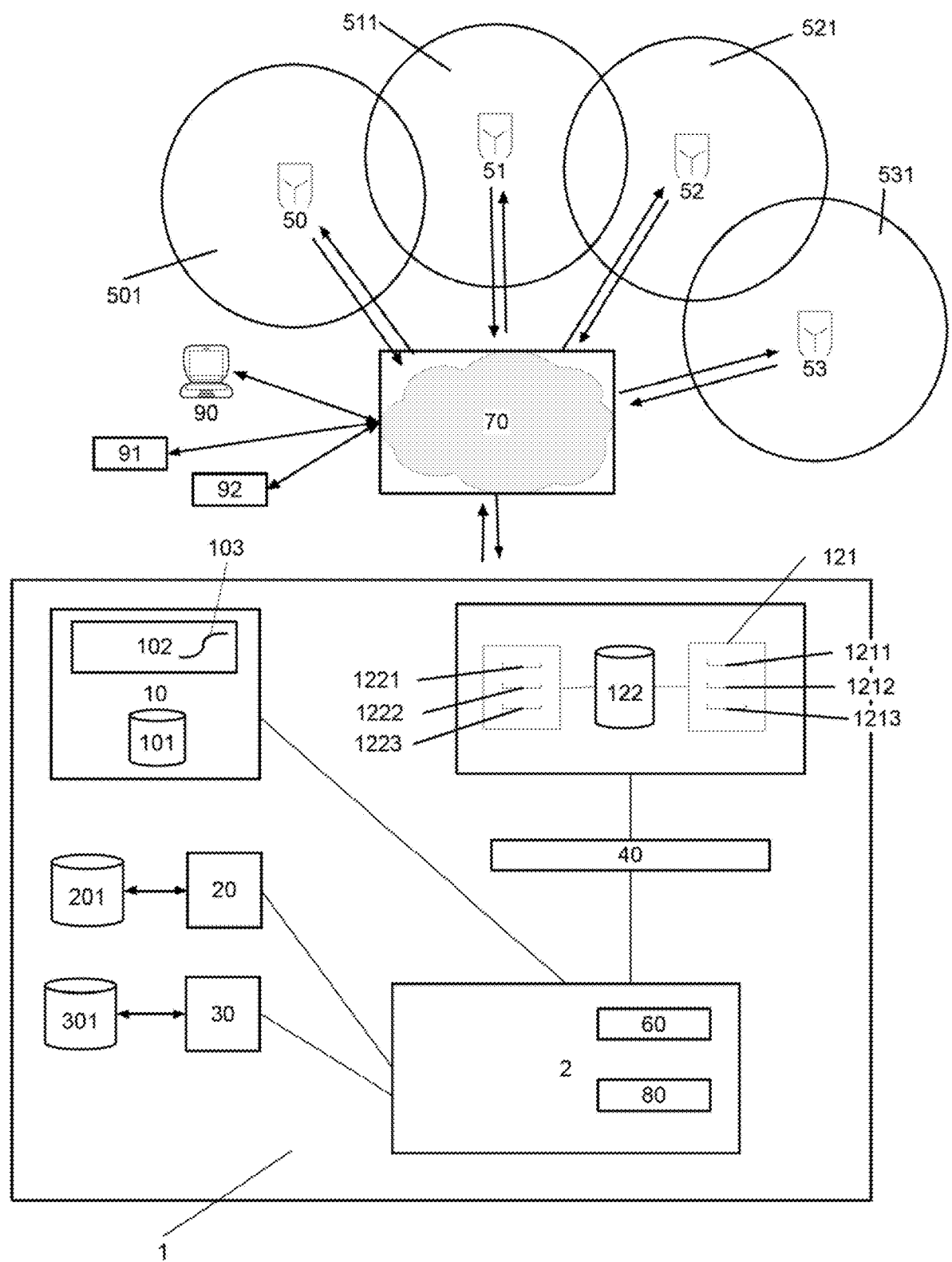
FIG. 3 shows a block diagram schematically depicting an architecture for a possible implementation of an embodiment of the automated disaster management and financing system 1 for forecasting the impact of disaster mitigation and financing means 30 based on location-dependent natural disaster impacts.

FIG. 3 schematically depicts an architecture for a possible implementation of an embodiment of the automated disaster management and management forecast system 1 for forecasting the impact of disaster mitigation and financing means based on location-dependent natural disaster impacts. For the computer-based disaster management and management forecast system 1, measuring parameters of historical disaster events are captured in order to determine the impact of natural disaster events and then critical values of parameters of natural disaster events are used as triggers in order to generate forecasts of the impacts of disaster events within a geographic area 501, 511, 521, 531 . . . .

Country-specific parameters 1211, 1212, 1213 of a risk-exposed country 501, . . . , 531 are captured, relating to stored predefined criteria 1221, 1222, 1223 by means of the associated measuring stations 50, . . . , 53. The country-specific parameters 1211, 1212, 1213 can comprise at least national economic and national budgetary parameters. The country-specific parameters 1211, 1212, 1213 of a risk-exposed country 501, . . . , 531 provide a country risk profile 121 giving a country-specific risk and structure scheme. The system 1 can e.g. comprise at least country-specific, predefined criteria 1211, 1212, 1213 for country-specific parameters 122 related to population 1221 and/or demographic 1222 and/or gross domestic product 1223 and/or sovereign budget and/or inflation rate and/or economic structure and/or export/import values. The country-specific parameters 1211, 1212, 1213 of a risk-exposed country 501, . . . , 531 can e.g. be captured by means of a user interface 90. The user interface 90 can e.g. comprise a first channel selectable by means of the user interface 90, in which a first budgetary share factor can be determined and assigned to the corresponding first disaster financing means 301 by a user or by a connected input device. In a second channel selectable by means of the user interface 90, a second budgetary share factor can e.g. be determined and assigned to the corresponding second disaster financing means 302. Finally, in a third channel selectable by means of the user interface 90, a third budgetary share factor is determined and assigned to the corresponding third disaster financing means 303. Table 3 below shows an example of a country profile 121 with the country-specific parameter 1211, 1212, 1213 values, which are masked or defined based on the parameter criteria (references) 1221, 1222, 1223.

TABLE 3

(Example of a country risk profile 121 with exemplary values of country-specific parameters 1211, 1212, 1213 defined based on the parameter criteria 122)

| | Criteria | | Parameter |
|---|---|---|---|
| Society | Population | Total | 24,220,402 |
| | | Below poverty line | 28.5% |
| | Median age | Female | 21.9 years |
| | | Male | 21.4 years |
| | | Total | 21.7 years |
| Economics | GDP (purchasing power parity) | US$ | 75 billion |
| | | Country comparison to the world | 81 |
| | GDP - real growth rate (US$) | | 13.6% |
| | | Country comparison to the world | 4 |
| | GDP - per capita (PPP) (US$) | | $3,100 |
| | | Country comparison to the world | 172 |
| | GDP - composition by sector | Agriculture | 28.3% |
| | | Industry | 41.0% |
| | | Services | 30.7% |

TABLE 3-continued (Example of a country risk profile 121 with exemplary values of country-specific parameters 1211, 1212, 1213 defined based on the parameter criteria 122)

|  | Criteria |  | Parameter |
|---|---|---|---|
| Public Financials | Budget | Revenues | $15.8 billion |
|  |  | expenditures | $17.8 billion |
|  |  | expenditures in % of GDP | 23.7% |
|  | Public debt (in % of GDP) |  | 36.2% |
|  | Inflation rate (consumer prices) |  | 8.7% |
|  | Debt - external |  | $7.511 billion |
| Industries | Agriculture - products |  | Cocoa, rice, cassava (manioc), peanuts, corn, shea nuts, bananas, timber |
|  | Industries |  | Mining, lumber production, light manufacturing, aluminum smelting, food processing, cement, small commercial ship building |
| Export and Import | Exports | US$ | $12.75 billion |
|  | Imports | US$ | $15.32 billion |
|  |  | Country comparison to the world | 84 |

One or more disaster event types 101 are assigned to a disaster history table 10. Each disaster event type 101 comprises a plurality of type-specific measuring parameters of historical natural disaster events and associated type-specific loss frequency function parameters 102, providing for each natural disaster event type 101 a corresponding loss frequency function 103. The magnitude of a loss to its expected exceedance frequency is parameterized by means of the loss frequency function 103, where the exceedance frequency is a measure of the annual probability that an event or loss will meet or exceed a given magnitude in any given timeframe. For example, at least four loss frequency functions 103 capturing the perils of hurricanes 1031, floods 1032, earthquakes 1033, and droughts 1034 can be generated together with the corresponding mapping parameters of the geographic risk map 20, based on the disaster history table 10 comprising the stored natural disaster event types 101. The expected catastrophe losses can e.g. be determined through numerical integration of the loss frequency function 103. Each country typically has a country-specific disaster history. For example a fictitious country can face several natural disasters each year, with the most extreme events in terms of economic damage and affected population for example being earthquakes, hurricanes, floods, and droughts. A disaster history of such a fictitious country from 1950-2011 for the aforementioned four major perils could e.g. look as follows in Table 4 below.

TABLE 4

(Example of a disaster history of a fictitious country from 1950-2011 for the four major perils of (i) earthquakes, (ii) hurricanes, (iii) floods, and (iv) droughts as entered in the disaster history table 10.

| Peril | Number of disasters | Total number of population affected | Average estimated economic damage per event (USD) |
|---|---|---|---|
| Earthquake | 9 | 11,991,241 | 525,813,000 |
| Hurricane | 18 | 9,647,561 | 392,549,000 |
| Flood | 21 | 3,585,864 | 263,811,000 |
| Drought | 33 | 4,498,352 | 229,481,000 |

Figure 4:
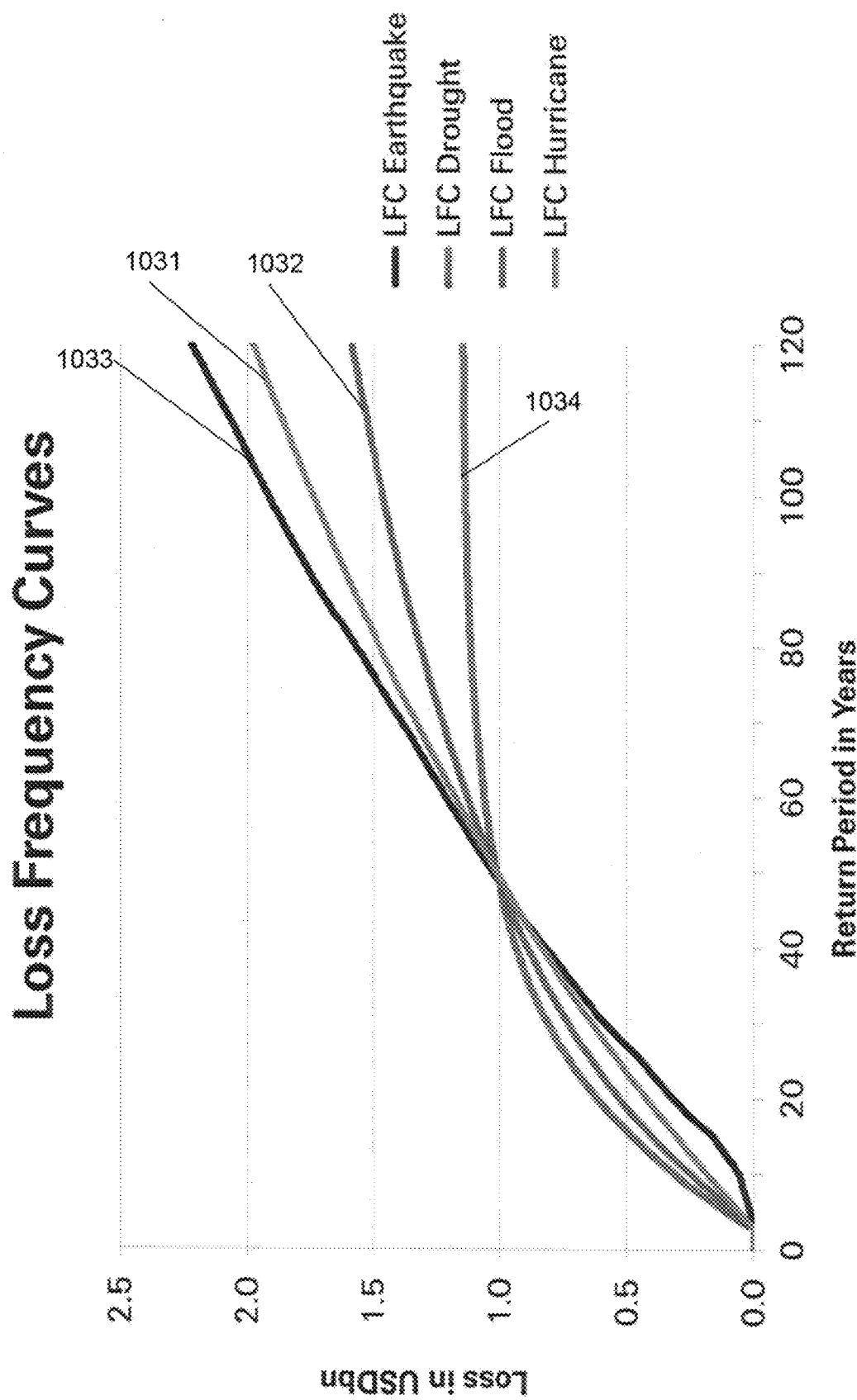
FIG. 4 shows an example of loss frequency functions 103 for a fictitious country for four disaster event types 101: hurricane 1031, flood 1032, earthquake 1033, and droughts 1034 generated based on the disaster history of a fictitious country and respectively based on the disaster history table 10.

In order to quantify how much a country is threatened by each of the various disaster event types 101, i.e. perils (for the fictitious country above earthquakes, hurricanes, floods, and droughts), the implemented assessment of the risks of a country provides the appropriate loss frequency curves 103 based on the disaster history. The loss frequency curve 103 relates the magnitude of a loss relative to its expected exceedance frequency, where the exceedance frequency is the annual probability that an event or loss will meet or exceed a given magnitude in any given year. FIG. 4 shows an example of loss frequency functions 103 for a fictitious country for the four disaster event types 101: hurricane loss frequency function 1031, flood loss frequency function 1032, earthquake loss frequency function 1033, and drought loss frequency function 1034 generated based on the disaster history of a fictitious country and respectively based on the disaster history table 10.

Figure 5:
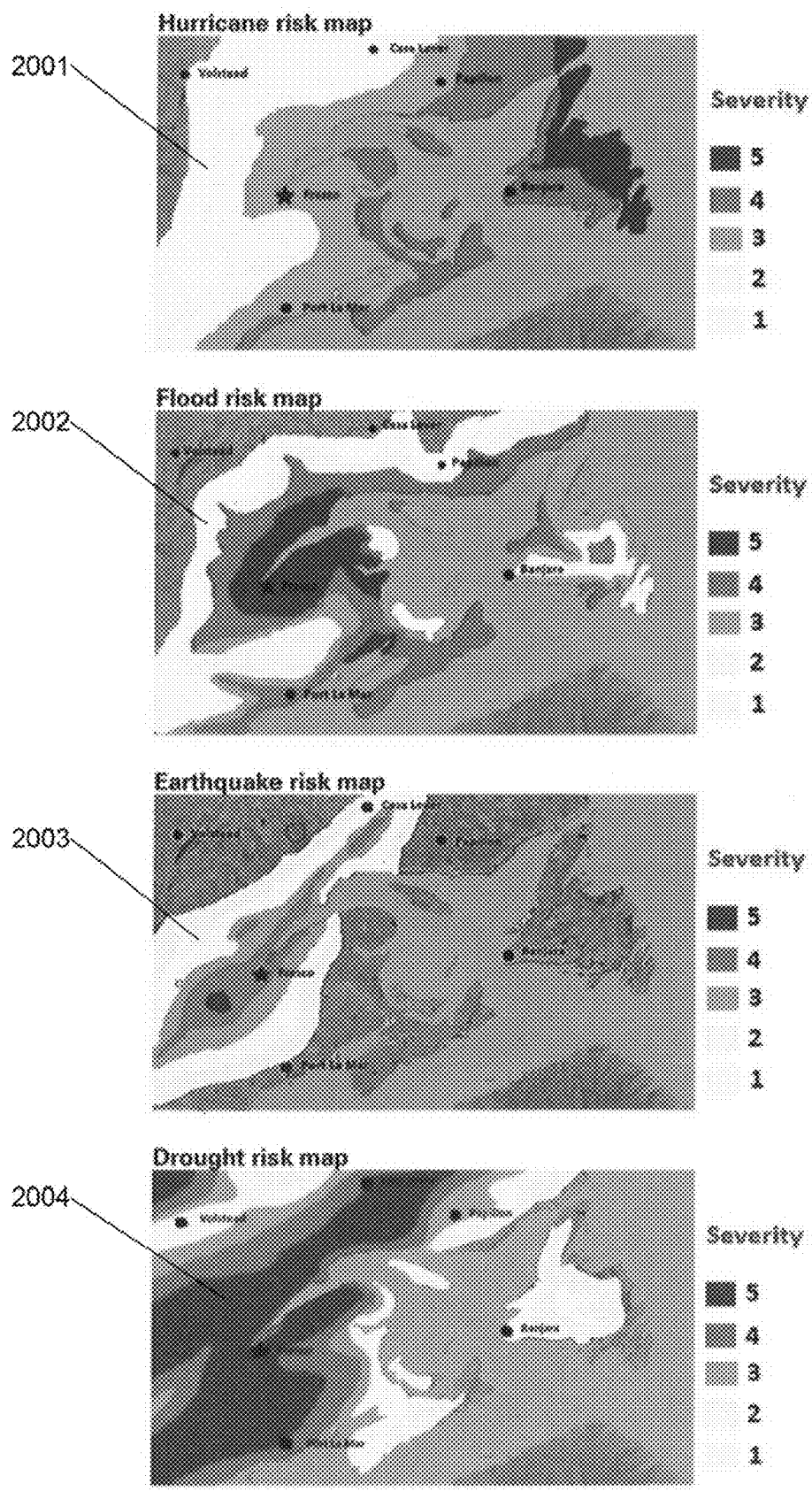
FIG. 5 shows four exemplary risk maps 20 provided by the above-mentioned exemplary numbers of the fictitious country for the four disaster event types 101: hurricane risk map 2001, flood risk map 2002, earthquake risk map 2003, and drought risk map 2004.

The system 1 comprises mapping parameters 201 for capturing and storing a geographic risk map 20. For each of the natural disaster event types 101, corresponding mapping parameters 201 are captured and stored, which define danger zones for the specific natural disaster event type 101. The mapping parameters 201 of the geographic risk map 20 can be displayed as graphical risk maps defining danger zones for the different disaster event types 101. FIG. 5 shows four exemplary geographic risk maps 20 provided by the above-mentioned exemplary numbers of the fictitious country for the four disaster event types 101: geographic hurricane risk maps 2001, geographic flood risk maps 2002, earthquake risk maps 2003, and drought risk maps 2004. The geographic risk map(s) 20 can comprise or be build up by the risk maps 20 for the different perils, as for example the mentioned geographic hurricane risk maps 2001, geographic flood risk maps 2002, earthquake risk maps 2003, and drought risk maps 2004.

The system 1 comprises a plurality of selectable disaster financing means 30. Each of the selectable disaster financing means 30 is assigned to a definable cost factor 301, 302, 303 capturing the capital cost of the disaster financing means 30 in relation to its application for disaster mitigation. For each of the selectable disaster financing means 30, a variable budgetary share factor can be allocated and adapted by means of an allocation module 40 defining a coverage structure in case of a catastrophic disaster event. For example, a first disaster financing means 30 can be related to a contingency reserves unit comprising an assigned cost factor set to 1, a second selectable disaster financing means 30 can be related to a contingent debt facility unit comprising an assigned cost factor depending on definable credit condition parameters, and a third selectable disaster financing means 30 can be related to an insurance facility unit comprising an assigned cost factor set to e.g. 1.7, which factor e.g. can be based on current market benchmarks. For example, the contingency reserves unit can be realized also as external functional and accessible unit, e.g. as a regional development bank system allowing the system 1 or a user of the system 1 to access to a contingent credit facility. In addition, the development bank system can offer means to establish a sovereign catastrophe insurance solution for the country and/or system 1. Each of the financing instruments has a capital cost, which is measured by the cost factor. The cost factor is the ratio of costs to loss. Further, the system 1 can comprise means for accessing a catastrophe reserve fund. Thus, the system 1 autonomously or the user by means of the system 1 can select in this example the following disaster financing means 30: (i) the contingency reserves unit lets assign the system 1 or a user a portion of the yearly country budget as a reserve fund, wherein by means of the contingency reserves unit the system 1 is enabled to immediately pay for catastrophe losses/reconstruction efforts in cash. No direct costs apply to this disaster financing means 30. However, by setting up a reserve fund parameter, the system 1 foregoes the option to use said budgetary part for other units or budgetary items or to invest it (opportunity cost). In addition, appropriately set boundary parameters, as e.g. budgetary restrictions may prevent the system 1 from allocating too big shares of the budget as reserve fund parameter. As another boundary parameter, time factor may be important in optimization. If a large event happens and the reserves have not been built up to the required amount, the difference will have to be post-financed. The assigned cost factor can be set to 1.00 for the contingency reserves unit; (ii) the contingent debt facility unit lets assign the system 1 or a user a portion of the yearly country budget as pre-defined credit lines where drawdown depends on the occurrence of a natural disaster. Provided by international financial systems or development bank systems, they offer immediate liquidity to affected countries until other sources of funding can be accessed. The credit drawn has to be paid back eventually with interest. The cost factor can be variable set by or to the system 1 depending on boundary conditions as credit conditions (interest rate and/or payback period);

(iii) the insurance facility unit lets assign the system 1 or a user a portion of the yearly country budget as insurance premium factor. Once the insurance facility unit is triggered (by the pre-determined event characteristics), it will cover all losses until an upper threshold value of cover is reached. In contrast to the contingency reserves unit, the price of insurance is not 100% of covered lasses. The yearly premium can e.g. be defined by the expected loss the insurance facility unit has to cover, plus a loading factor in order to cover expenses of the insurance facility unit and is a fraction of the total limit provided. Transferred payouts of the insurance facility unit do not need to be paid back. As mentioned above, the assigned cost factor can e.g. be set to 1.70 of insurance facility unit's expected loss, which factor e.g. can be based on current market benchmarks. 1.7 is an average, which e.g. can be based on current market benchmarks or can be assumed or determined otherwise, for example. However, other values are possible and actual values may vary based on the circumstances of the insurance parameters' definition. The realized cost factor (i.e. the actual ratio of transferred premium over losses by the system 1 and/or the country) will depend on the losses effectively occurring.

Expected catastrophe losses are determined by means of the loss frequency function 103 and the geographic risk map 20 for various scenarios of occurring natural disaster event types 101 and a forecast of the effect of the disaster financing means 30 to cover these losses is prepared based on the coverage structure, the assigned cost factors 301, and the determined expected catastrophe losses.

The budgetary share factors of the coverage structure are varied by means of the user interface 90 by a user or an automated input device in order to optimize the effect of the disaster financing means 30 to cover possible losses.

The system 1 can comprise predefined or otherwise fixed threshold parameters for each budgetary share factor, limiting the possibility of variation of the corresponding budgetary share factor. Setting the corresponding threshold parameter, a certain budgetary share factor can only by varied up to the assigned threshold value, thus preventing a possible user or the system 1 from allocating more budgetary value to this budgetary share factor. As an embodiment variant, the system 1 can e.g. comprise a MonteCarlo module 60 for generating a probabilistic Monte Carlo loss simulation for a probabilistic multi-year simulation as a final test of the effectiveness of a chosen coverage structure for a specific pre-financing scheme. The MonteCarlo module 60 can e.g. generate the probabilistic Monte Carlo loss simulation for a probabilistic 30-year simulation. In this way, the present invention is able to provide a user with experience and insight into the experience of a Country Risk Officer (CRO) by looking at the nation's risk profile 121 and creating an appropriate risk management plan to be tested through realistic scenarios. In that sense, the invention also can serve as automated training device based on fictitious countries profiles 121 and respective country-specific parameters 1211, 1212, 1213. For example, a user can be appointed to the role of fictitious Country Risk Officer of a fictitious country, say Costa Azul. By means of the system 1, the user can be placed in charge of completing the disaster risk management strategy for the government of the fictitious state Costa Azul. The profile 121 of the fictitious state can be modeled in any appropriate way by means of the country-specific parameters 1211, 1212, 1213. For example, Costa Azul can be modeled as an emerging market country located in a tropical climate. For Costa Azul, the economic expansion can, for example, be combined with the expectation of more intense natural catastrophes related to global climate change, wherein the total human and economic costs of natural disasters for Costa Azul are likely to rise in the future. For a training example, the user can suppose that comprehensive measures have already been taken for risk mitigation. However, pre-disaster risk financing is still a component to be elaborated by the CRO, i.e. the user. The budget available depends on the country profile 121, as defined. The user as trainee has to set up an efficient financing scheme. In this example, the user as CRO can e.g. suppose that his responsibilities include: (i) identifying emerging risks, (ii) establishing a frequency/severity risk landscape; (iii) steering mitigation efforts towards the largest risks (either frequency or severity); and (vi) developing a risk financing plan for risks that cannot be fully prevented or mitigated. To be trained by the system 1, the user can suppose that substantial mitigation efforts have already been made, for example in order to ensure strict building codes for all new construction, or that barriers are built around infrastructure to help mitigate the exposure to earthquake and flooding, or bridges are built to resist strong winds, or a public alarm system for early notification has been put in place etc. etc. Therefore, the user only needs to set a up an efficient scheme for applying the available disaster financing means 30. In other words, to use the system for training, the user can suppose that the above-mentioned responsibilities have all been met to date, except for the development of a risk financing scheme. The user now needs to focus on providing for the most efficient way to transfer a portion of the country's risks off the government's balance sheet.

To provide the most optimized apportionment by scaling the corresponding budgetary share factors in the risk financing scheme, the user who is to be trained by the system 1 applies his knowledge based on the country risk profile 121, the country-specific parameters 1211, 1212, 1213, the country-specific occurrence of natural hazards, the risk map 20 and/or risk maps 2001, 2002, 2003, 2004, their parameters of occurrence, and the loss frequency function 103 and/or loss frequency functions 1031, 1032, 1033, 1034. Thus, the system 1 lets the user systematically address how the government can assess and reduce the losses from cyclones and how it can best prepare for providing relief and reconstruction in the event of a disaster, i.e. lets the user systematically build up an appropriate strategy pattern. It is to be noted, that in the embodiment variant of the fully automated system 1, the appropriate factors and parameter values, as mentioned above, are captured by measuring and/or capturing and/or filtering means of the system 1. By means of the geographic risk map 20, the system allows the user to interactively view their country's or region's exposure to direct asset risks and (indirect) financial, fiscal, and economic impacts of disaster scenarios. The outcome for reducing disaster risk can be assessed by the system 1 and expressed with indicators of interest to the user, such as the budget stance, debt, and economic growth. Based on an assessment of their country's or region's vulnerability and risk, one of the purposes of the system 1 is to provide a systematic and automated system 1 for assessing policy options related to financial risk management, including balancing and allocating the risk-transfer instruments (i.e. the disaster financing means 30 such as reserve funds, insurance, and catastrophe bonds) and their parameters such as the budgetary share factors, respectively. The system 1 can comprise a graphical user interface and is interactive (including a stand-alone application), that is, users can and should change the model parameters, given different preferences and parameter uncertainty. For example, the user can adjust the amount of risk and debt that the country is willing to take on, and the system 1 will show how this changes the country's vulnerability to disasters and how it affects different policy paths. One of the purposes of the system 1 is to provide automated means for reducing a country's risks of experiencing a "resource/financing gap" or the inability to meet its post-disaster obligations in terms of repairing public infrastructure and providing needed relief to the private sector. For this purpose, the user will need to use the above-mentioned information about assessing financial and macroeconomic risks and vulnerability. The user must also consider how to reduce or mitigate human and economic losses and finally, he must create an appropriate risk management framework for the country (See fig.). Apart from the embodiment variant of a fully automated system 1 (i.e. operating completely without any human interaction), the above-mentioned application of the system 1 allows for a different use. For example, the user can use the above-mentioned interface module to propose starting parameters, e.g. for the variable budgetary share factor, wherein the system 1 optimizes the starting parameters in order to achieve a global or local maximum for the parameters. In an other variant, the system 1 proposes starting parameters, i.e. budgetary share factor, wherein these parameters are varied in the following by the user, allowing him to understand the effect of different variations on the outcome of the risk transfer. The above embodiments also allow a user to vary the parameters during optimization by means of the system 1 in order to overcome local maxima or minima, where the optimization operation may stick.

If a user performs the development of an appropriate risk management strategy by adapting the above-mentioned factors, first, the user considers the interaction of natural hazard-caused losses and the government, i.e. the financial risks of asset losses and relief expenditures to assist households and business, and the proportion of financial losses that will be absorbed by the government. Therefore, the country risk officer must first determine or assess the risk to the country's public sector assets. For example, the above-mentioned risk depends on the frequency and intensity of natural hazards, the assets exposed to natural hazards, and their physical vulnerability to a specific type of natural hazard, as captured by the loss frequency functions 1031, 1032, 1033. Second, based on the limited country resources for reducing human and economic losses, which are represented, for example, by parameters such as the gross domestic product (GDP) of the country, the parameter should be varied in such a way that the country becomes as financially resilient as possible, or provides sufficient funds for financing reconstruction of public infrastructure and for providing relief to households and the private sector. On the other hand, financial resilience depends on how much a natural hazard risk can be reduced so that it has less effect on the general economic conditions of the country. Thus, the country risk officer has to balance the resilience of the country's public sector, based on the risk or on the achieved risk reduction. Next, it is important that the country risk officer carefully tries to determine or estimate the so called "resource gap," which is the difference between the contingent post-disaster liabilities of the country or its government for repairing infrastructure and providing relief to the private sector and the sources of funding available to the government. The system 1 can automatically assess this by simulating the risks to public assets and estimating the government's ability to cover these risks and provide private sector assistance. The assessment is among other things based on the country-specific parameters 1211, 1212, 1213. When adapting the parameter, the country risk officer should also try to synchronize the disaster risk with national development planning, e.g. by incorporating financial disaster risk and potential financing gaps for funding possible losses into macroeconomic projections of the country. For the system 1, the consequences can e.g. be related to variables such as economic growth or the country's external debt situation.

These indicators represent impacts on economic flows as compared to impacts on stocks addressed by the financial asset risk estimation. Typically, the country risk officer should be primarily concerned about loss of life from natural hazards and also about loss of livelihood and productive assets directly or indirectly affecting mostly the country's public sector assets. It is therefore often important to a risk management scheme or coverage structure to consider the cost-effectiveness of an applied parameter scheme in reducing human and economic losses. Finally, for an effective disaster risk plan, the country risk officer uses the allocation module 40 and the applied coverage structure with the variable budgetary share factors, to allocate the budget among the available options for reducing the risk of a resource gap, including insurance, catastrophe bonds, and a reserve fund or contingent credit arrangements. It is important to balance risk optimization against the cost-effectiveness of the available disaster financing means 30, i.e. the cost factors 301, of disaster financing means, in reducing the resource gap risk. The system 1 can be used to develop strategies, while the system 1 assesses if a proposed scheme in fact reduces the risks of disasters and enhances the financial resilience of the country, or not. The development of an efficient risk-financing scheme, i.e. a coverage structure, by means of the system 1 has to be understood as an adaptive process, where measures are continuously revised after their impact on reducing financial vulnerability and risk has been assessed.

In the above example of using the system 1 for training a country risk officer, a user of the system 1 may use the information provided by the country risk profile 121, the disaster history table 10, and/or the geographic risk map 20 to identify the disaster risks with the most urgent pre-financing need (in the above example: earthquakes, hurricanes, floods, and droughts). However, by a combination of both frequency and severity, the most dangerous and costly natural disasters affecting a country can also be determined by the system 1 or the core engine 2 of the system 1. When using the system 1 as training system, a user can once again suppose, for example, that other mitigation means different from disaster financing means 30 have already been taken into account. So the user who defines the variable budgetary share factor of the coverage structure 40 for the disaster financing means 30 does not have to care about the preparedness of a country for natural disaster events. For example the user can simply suppose that the established risk maps 20 are used for the introduction of stricter building codes for potentially affected houses and infrastructure; early warning systems for both hurricanes and earthquakes are in place, schools and public institutions are expected to conduct regular evacuation exercises etc. etc. Therefore, the user defining the variable budgetary share factor may use all of the information provided to get a holistic picture of a country's risk landscape and, using the variable budgetary share factor of the coverage structure 40 for the disaster financing means 30, decide how to create an appropriate coverage and mitigation scheme for each disaster event type 101.

In another embodiment variant, the allocation module 40 can e.g. comprise a second Monte Carlo module 80. By means of the second Monte Carlo module 80 and based on the allocated variable budgetary share factors of the coverage structure 40, a plurality of data records comprising coverage structures 40 with varied budgetary share factors can e.g. be generated, wherein the coverage structure 40 with the allocated budgetary share factors is optimized by means of a core engine 2 of the system 1 based on the effect of the disaster financing means 30 for various scenarios of occurring natural disaster event types 101.

The allocation module 40 can also comprise, for example, an activating device by means of which, based on the generated coverage structure with the allocated budgetary share factors, it is possible to transmit a corresponding control signal to the monitoring device 91. The allocation module 40 can also comprise a signaling device 92, wherein the selectable disaster financing means 30 are activated based on the allocated budgetary share factors by means of signal transmission. As an embodiment variant, the signaling device 92 can, upon triggering an optimized coverage structure, activate the selectable disaster financing means 30 based on the allocated budgetary share factors by means of signal transmission.

To assess the risks of a country, i.e. the risk with respect to the country's assets and economic operability in case of a natural hazard, the system 1 can e.g. comprise means to perform a hazard assessment dedicated to the various possible hazards, e.g. hurricanes, floods, droughts, or earthquakes. The assessment can e.g. be performed based on historical data of historical events and corresponding losses for a specific natural hazard. To determine the damage potential of natural hazards, different techniques can be applied, e.g. stochastic or engineering approaches for determining physical vulnerability of the assets exposed. However, historical losses can also be used for direct risk assessment. The catastrophe risk assessment can e.g. be captured by means of different dedicated modules, e.g. a catastrophe module, an exposure module, a vulnerability module, and a loss module, wherein the latter integrates the results from the first three modules by means of risk metrics or loss, distributions. Loss distributions are cumulative distribution functions where the x-axis represents the losses, e.g. represented by monetary loss parameters, annual loss parameters in terms of GDP, or capital stock loss parameters. The y-axis, represents the probability that losses do not exceed a predetermined threshold value. For example, a value of 0.6 on the y-axis means that with a probability of 60%, the losses will not exceed the predetermined threshold value of damage. In other words, with a probability of 40%, the losses will exceed this level of damage. However, a 40% probability also means that an event happens on average once every 2.5 years (1/0.4=2.5). This means that the longer the return period, the lower the probability of the event, but the higher the losses. The loss distribution function comprises various risk measures that can be derived from it. For example, (i) the average annual loss (integrated area above the loss distribution), (ii) the Value at Risk (VaR) defined as $VaR(p)=F^{-1}(1-p)$, where $F^{-1}$ is the quantile function defined as the inverse of the loss distribution function or (iii) Probable Maximum Loss (PML), which is associated with a given probability of exceedance.

For the system 1, it is possible, for example, to choose between two possible approaches in order to carry out the determination of the risk transfer function: (i) via catastrophe models or (ii) using historical data, i.e. historical events. However, other methods can be used to derive the risk transfer function. As mentioned, dedicated modules can be used for performing the catastrophe assessment, e.g. a catastrophe module, exposure module, vulnerability module, and loss module, all performing different functions. The catastrophe module comprises e.g. at least three variables regarding the source parameters of the hazard: the location of future events, their frequency of occurrence, and their severity. These parameters can be based on filtering historical and/or engineering data, e.g. by simulating potential hurricane tracks to increase the number observations. The probability of a given event has to be determined either by time-series analysis or by assuming suitable stochastic models, e.g. non-homogeneous Poisson distribution of the probability of a hurricane event. In addition, the intensity is determined. The exposure module captures the spatial distribution of the assets exposed. An appropriate hash table comprising variable parameters reflecting regional differences in construction practices and building codes can be created and comprised in the module. For risk assessment, the spatial resolution of the exposure data can be used following any order such as storms, earthquakes, floods, droughts, and man-made hazards. The process of inventory development can be a difficult and time-consuming task. However, it is an important part of the risk assessment process. For the process, the system 1 can use satellite images and tier classification with asymmetric mapping. In addition, the vulnerability module quantifies the physical impact of the natural hazard on the exposed elements. For example, it expresses the relationship between the intensity of the natural hazard and the percentage of houses damaged, e.g. a damage ratio parameter. Since the intensity measure and the level of damage can typically not be captured by means of one precise value, the damage cannot be expressed as a precise quantity either, but only within a range of error or uncertainty. Underlying each damage function is a frequency component and a severity component. The first determines the probability that an exposed element will be damaged and the second determines the percentage of property damaged, assuming damage has occurred. For example, the relationship between damage and wind speed depends on the construction of the building, the age of the building, the topographical and environmental exposure of the building, etc. Finally, the loss module integrates and transforms the damages into a needed measure, such as monetary loss parameters. Various risk metric schemes can be applied, e.g. value at risk, exceedance probabilities, hazard maps, or loss distribution functions. Again, the loss module therefore captures and technically implements a possible function for the total damage e.g. in monetary terms. By means of the above modularized structure, the system 1 can automatically provide the appropriate loss distribution functions and loss frequency function 103 as well as appropriate geographic risk maps 20. It is also possible to capture future changes e.g. by incorporating a dynamic setting into the four modules, which can e.g. be dynamically adapted by an appropriate expert unit or system 1. Such future changings can e.g. comprise a change of the natural hazard intensity and/or frequency, changes in vulnerability due to economic and social development, or changes in risk exposure.

If the system 1 is implemented based on historical data module, the system can use historical data of natural hazards in combination with the extreme value theory. Based on the total annual natural hazard losses, an optimization algorithm for selecting the best fit under the assumption of an extreme value distribution as well as generalized Pareto distribution can be used. For example, a sequence of parameter fits can be obtained based on a weighted average function of those data points between projected return periods, which subsequently can be used as the next starting point, in iterative fashion throughout the process. The system 1 can thus provide final results e.g. for both the GEV and the GP fits (loss distribution based on Generalized Extreme value distribution and loss distribution based on a Pareto distribution.) Also by means of the described historical data module, the system 1 can be implemented to automatically provide the appropriate loss distribution functions and loss frequency function 103 as well as appropriate geographic risk maps 20. In order to determine a robustness parameter of the operation of the system 1, the two embodiments variants can e.g. be operated in parallel. If both of the above system's embodiment variants and methods, i.e. the implementation by means of the dedicated modules as the above-described catastrophe module, exposure module, vulnerability module, and loss module, and the implementation by means of the described historical data module, show comparable results, then some robustness of the results can be expected.

The invention claimed is:

1. An automated, electronic, self-adjustable disaster management and signaling method for a system with improved operational adjustments to instrumental elements comprising instrumental, automatically signaled disaster mitigation elements based on location-dependent natural disaster impact forecast, wherein measuring parameters of historical disaster events are captured to determine impact of natural disaster events and then critical values of parameters of natural disaster events are used as triggers to generate forecasts of the impacts of disaster events within a geographic area, the management and signaling method comprising: capturing country-specific parameters of a risk-exposed country relating to stored predefined criteria, the country-specific parameters comprising at least national economic and national budgetary parameters; assigning one or more disaster event types to a disaster history table, each disaster event type comprising a plurality of type-specific measuring parameters of historical natural disaster events and associated type-specific loss frequency function parameters that provide a corresponding loss frequency function provided by the assessment of risks of a country and quantifying the threat of a country by each of the various disaster event types for each natural disaster event type, wherein the magnitude of a loss to its expected exceedance frequency is parameterized by means of the loss frequency function provided by the assessment of the risks of a country and quantifying the threat of a country by each of the various disaster event types, and where the expected exceedance frequency is a measure of the annual probability that an event or loss will meet or exceed a given magnitude in any given timeframe; capturing and storing mapping parameters for a geographic risk map, for each of the natural disaster event types, the mapping parameters defining danger zones for the specific natural disaster event type and the geographic risk map being build up by the risk maps for different perils; generating loss frequency functions capturing the perils together with the corresponding mapping parameters of the geographic risk map based on the country-specific disaster history table comprising the stored natural disaster event types; selecting each of a plurality of disaster financing types to a definable cost factor capturing a capital cost of the disaster financing type in relation to its application for disaster mitigation, and for each of the selectable disaster financing types, allocating and adapting, by an allocation device, a variable budgetary share factor having a fixed threshold parameter and defining a coverage structure defining an extent of covering losses in case of a catastrophic disaster event, wherein a first disaster financing type is related to a contingency reserves facility comprising an assigned cost factor, defined as a ratio of costs to loss, set to 1, a second selectable disaster financing type is related to a contingent debt facility comprising an assigned cost factor depending on definable credit condition parameters, and a third selectable disaster financing type is related to an insurance facility comprising an assigned cost factor set to a factor based on current market benchmarks; determining expected catastrophe losses by the loss frequency function and the geographic risk map for various scenarios of occurring natural disaster event types; generating a forecast of an effect of the selected disaster financing type to cover the catastrophe losses based on the coverage structure by associating first data with second data, wherein (i) the first data relates to the assigned cost factors, and the determined expected catastrophe losses, and (ii) the second data relates to a geographic map, the first data and the second data being captured by the system; adapting by the system the coverage structure by continuously revising the first data to the second data after their impact on reducing financial vulnerability and risk that has been assessed, wherein via a Monte Carlo module and based on the allocated and continuously revised variable budgetary share factors of the coverage structure, a plurality of data records comprising coverage structures with varied budgetary share factors are generated, wherein the allocated budgetary share factors of the coverage structure are optimized via a core engine of the system based on the effect of the disaster mitigation elements for various scenarios of occurring natural disaster event types; and activating selectable disaster mitigation elements based on the optimized allocated budgetary share factors via a signal transmission of a signaling device of the allocation device, the signaling device, upon triggering an optimized coverage structure with optimized allocated budgetary share factors, activating the selectable disaster mitigation elements based on the allocated budgetary share factors via the signal transmission to provide the automated disaster risk management.

2. The disaster management and signaling method according to claim 1, further comprising: generating, based on the disaster history table comprising the stored natural disaster event types, at least four loss frequency functions capturing the perils of hurricanes, floods, earthquakes, and droughts together with the corresponding mapping parameters of the geographic risk map.

3. The disaster management and signaling method according to claim 1, wherein the system comprises at least country-specific, predefined criteria for country-specific parameters related to population, and/or demographic, and/or gross domestic product, and/or sovereign budget, and/or inflation rate, and/or economic structure, and/or export/import values.

4. The disaster management and signaling method according to claim 1, wherein the determining determines the expected catastrophe losses by numerical integration of the loss frequency function.

5. The disaster management and signaling method according to claim 1, further comprising: generating a probabilistic Monte Carlo loss simulation for a probabilistic multi-year simulation as a final test of effectiveness of a chosen coverage structure for a specific pre-financing scheme.

6. The disaster management and signaling method according to claim 5, wherein the generating generates the probabilistic Monte Carlo loss simulation for a probabilistic 30-year simulation.

7. The disaster management and signaling method according to claim 1, further comprising: determining and assigning a first budgetary share factor to the corresponding first disaster financing type, in a first channel selectable via a user interface; determining and assigning a second budgetary share factor to the corresponding second disaster financing type, in a second channel selectable via the user interface; and determining and assigning a third budgetary share factor to the corresponding third disaster financing type, in a third channel selectable via the user interface.

8. The disaster management and signaling method according to the claim 7, wherein the budgetary share factors of the coverage structure are varied to optimize the effect of the disaster financing types to cover possible losses.

9. The disaster management and signaling method according to claim 1, further comprising: transmitting, by an activating device comprised in the allocation device, a corresponding control signal to a monitoring device, based on the generated coverage structure with the allocated budgetary share factors.

10. An automated, electronic, self-adjustable disaster management and signaling system with improved operational adjustments to instrumental elements comprising instrumental, automatically signaled disaster mitigation elements based on location-dependent natural disaster impact forecast, wherein measuring parameters of historical disaster events are captured to determine impact of natural disaster events and then critical values of parameters of natural disaster events are used as triggers to generate forecasts of the impacts of disaster events within a geographic area, the management and signaling system comprising: processing circuitry configured to capture country-specific parameters of a risk-exposed country, relating to stored predefined criteria, the country-specific parameters comprising at least national economic and national budgetary parameters, assign one or more disaster event types to a disaster history table, each disaster event type comprising a plurality of type-specific measuring parameters of historical natural disaster events and associated type-specific loss frequency function parameters that provide a corresponding loss frequency function provided by the assessment of risks of a country and quantifying the threat of a country by each of the various disaster event types for each natural disaster event type, wherein the magnitude of a loss to its expected exceedance frequency is parameterized by means of the loss frequency function provided by the assessment of the risks of a country and quantifying the threat of a country by each of the various disaster event types, and where the expected exceedance frequency is a measure of the annual probability that an event or loss will meet or exceed a given magnitude in any given timeframe, capture and store mapping parameters for a geographic risk map, for each of the natural disaster event types, the mapping parameters defining danger zones for the specific natural disaster event type and the geographic risk map being build up by the risk maps for different perils;

generate loss frequency functions capturing the perils together with the corresponding mapping parameters of the geographic risk map based on the country-specific disaster history table comprising the stored natural disaster event types;

select each of disaster financing types to a definable cost factor capturing a capital cost of the disaster financing type in relation to its application for disaster mitigation, and for each of the selectable disaster financing types, allocate and adapt a variable budgetary share factor having a fixed threshold parameter and defining a coverage structure defining an extent of covering losses in case of a catastrophic disaster event, wherein a first disaster financing type is related to a contingency reserves facility comprising an assigned cost factor, defined as a ratio of costs to loss, set to 1, a second selectable disaster financing type is related to a contingent debt facility comprising an assigned cost factor depending on definable credit condition parameters, and a third selectable disaster financing type is related to an insurance facility comprising an assigned cost factor set to a factor based on current market benchmarks;

determine expected catastrophe losses by the loss frequency function and the geographic risk map for various scenarios of occurring natural disaster event types;

generate a forecast of an effect of the selected disaster financing type to cover the catastrophe losses based on the coverage structure by associating first data with second data, wherein (i) the first data relates to the assigned cost factors, and the determined expected catastrophe losses, and (ii) the second data relates to a geographic map, the first data and the second data being captured by the system;

adapt by the system the coverage structure by continuously revising the first data to the second data after their impact on reducing financial vulnerability and risk that has been assessed, wherein via a Monte Carlo module and based on the allocated and continuously revised variable budgetary share factors of the coverage structure, a plurality of data records comprising coverage structures with varied budgetary share factors are generated, wherein the allocated budgetary share factors of the coverage structure are optimized via a core engine of the system based on the effect of the disaster mitigation elements for various scenarios of occurring natural disaster event types; and activate selectable disaster mitigation elements based on the optimized allocated budgetary share factors via a signal transmission of a signaling device, the signaling device, upon triggering an optimized coverage structure with optimized allocated budgetary share factors, activating the selectable disaster mitigation elements based on the allocated budgetary share factors via the signal transmission to provide the automated disaster risk management.

11. The disaster management and signaling system according to claim 10, wherein the processing circuitry is further configured to generate, based on the disaster history table comprising the stored natural disaster event types, at least four loss frequency functions capturing the perils of hurricanes, floods, earthquakes, and droughts together with the corresponding mapping parameters of the geographic risk map.

12. The disaster management and signaling system according to claim 10, wherein the management and financing system comprises at least country-specific, predefined criteria for country-specific parameters related to population, and/or demographic, and/or gross domestic product, and/or sovereign budget, and/or inflation rate, and/or economic structure, and/or export/import values.

13. The disaster management and signaling system according to claim 10, wherein the processing circuitry determines the expected catastrophe losses by numerical integration of the loss frequency function.

14. The disaster management and signaling system according to claim 10, wherein the processing circuitry is further configured to generate a probabilistic Monte Carlo loss simulation for a probabilistic multi-year simulation as a final test of effectiveness of a chosen coverage structure for a specific pre-financing scheme.

15. The disaster management and signaling system according to claim 14, wherein the processing circuitry generates the probabilistic Monte Carlo loss simulation for a probabilistic 30-year simulation.

16. The disaster management and signaling system according to claim 10, wherein in a first channel selectable via a user interface, a first budgetary share factor to the corresponding first disaster financing type is determined and assigned, in a second channel selectable via the user interface, a second budgetary share factor to the corresponding second disaster financing type is determined and assigned, and in a third channel selectable via the user interface, a third budgetary share factor to the corresponding third disaster financing type is determined and assigned.

17. The disaster management and signaling system according to the claim 16, wherein the budgetary share factors of the coverage structure are varied to optimize the effect of the disaster financing types to cover possible losses.

18. The disaster management and signaling system according to claim 10, wherein the processing circuitry is further configured to transmit a corresponding control signal to a monitoring device, based on the generated coverage structure with the allocated budgetary share factors.

* * * * *